July 20, 1926.

E. H. REMDE 1,593,103

INDUSTRIAL TRUCK

Original Filed March 11, 1921   3 Sheets-Sheet 1

Inventor.
Edward H. Remde
By
Edward R. Alexander
Atty

July 20, 1926.
E. H. REMDE
1,593,103
INDUSTRIAL TRUCK
Original Filed March 11, 1921   3 Sheets-Sheet 2

Inventor:
Edward H. Remde
By
Edward R. Alexander
atty

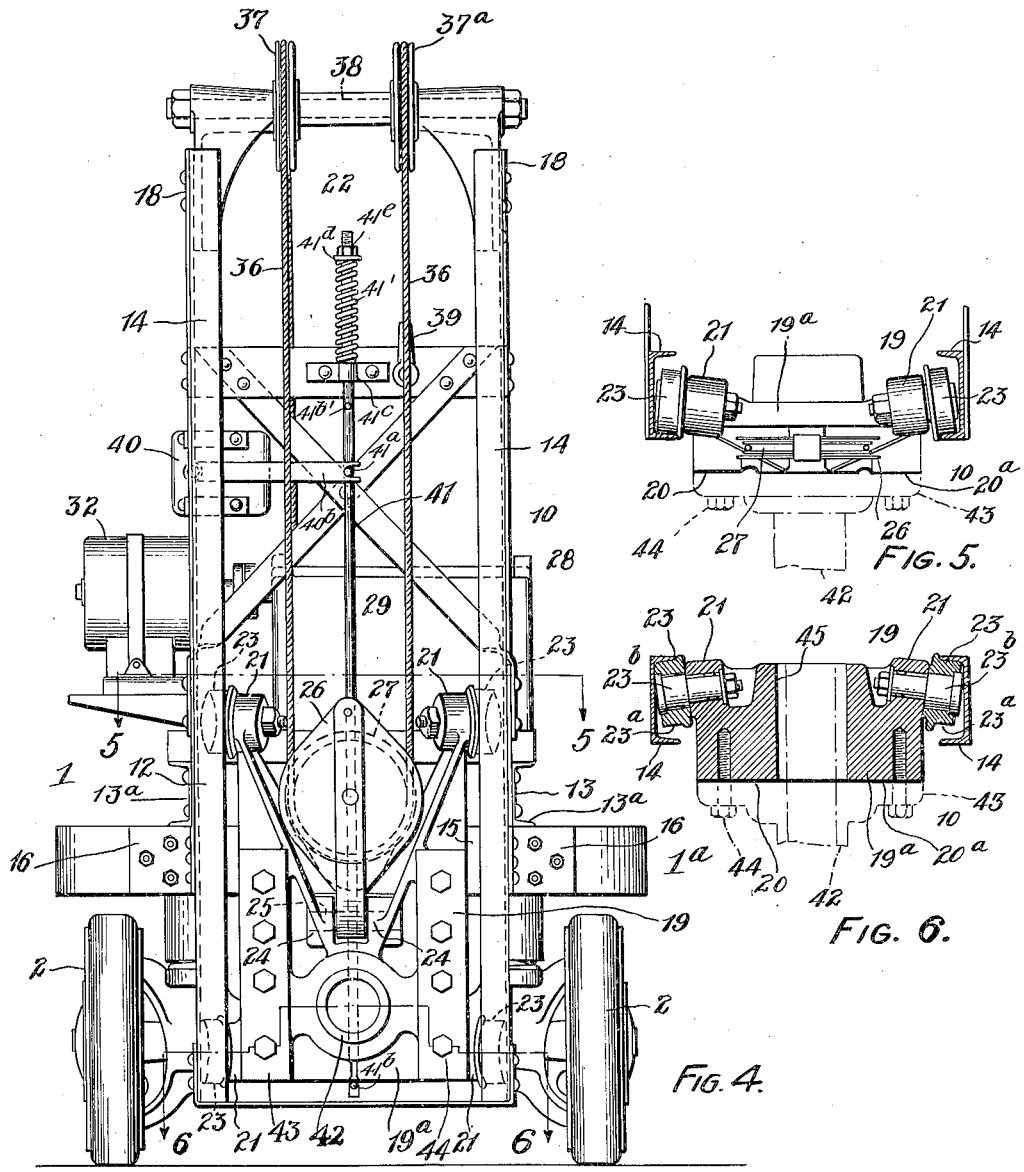

Patented July 20, 1926.

1,593,103

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Original application filed March 11, 1921, Serial No. 451,622. Divided and this application filed April 14, 1924. Serial No. 706,339.

This invention relates to a truck for industrial uses, more particularly to a truck having mounted on it an elevating and carrying mechanism, whereby goods can be transported from place to place rapidly and economically.

One object of the invention is to provide a truck of this character having an elevating mechanism and improved means for automatically stopping the elevated mechanism when its elevating member is moving in one direction.

Another object of the invention is to construct a truck of this character and to combine therewith means for automatically stopping the elevating mechanism when its elevating member is moving in either direction.

Other objects of the invention will be apparent to those skilled in the art to which my invention relates from the following description taken in connection with the accompanying drawings:

For the purpose of illustration, I have, in the accompanying drawings shown and herein described one form of apparatus embodying my invention.

Fig. 4 is a front view of the parts shown in Fig. 3.

Fig. 5 is a sectional view on the line 5—5 of Fig. 4.

Fig. 6 is a sectional view on the line 6—6 of Fig. 4.

Fig. 9 is a section similar to Fig. 7, but showing the contacts of the switch cut-out mechanism separated to open the motor circuit.

Figure 2:
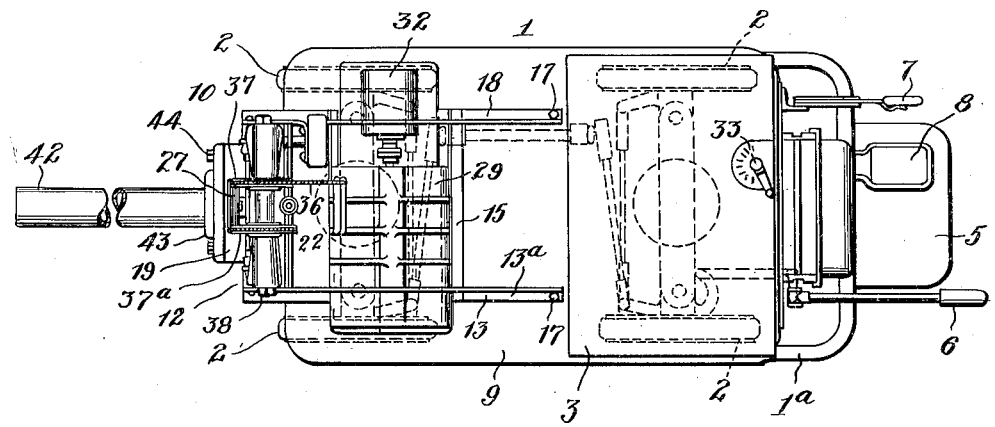
Fig. 2 is a top plan view of the truck shown in Fig. 1, the preferred form of steering construction being shown in dotted lines.
Figure 1:
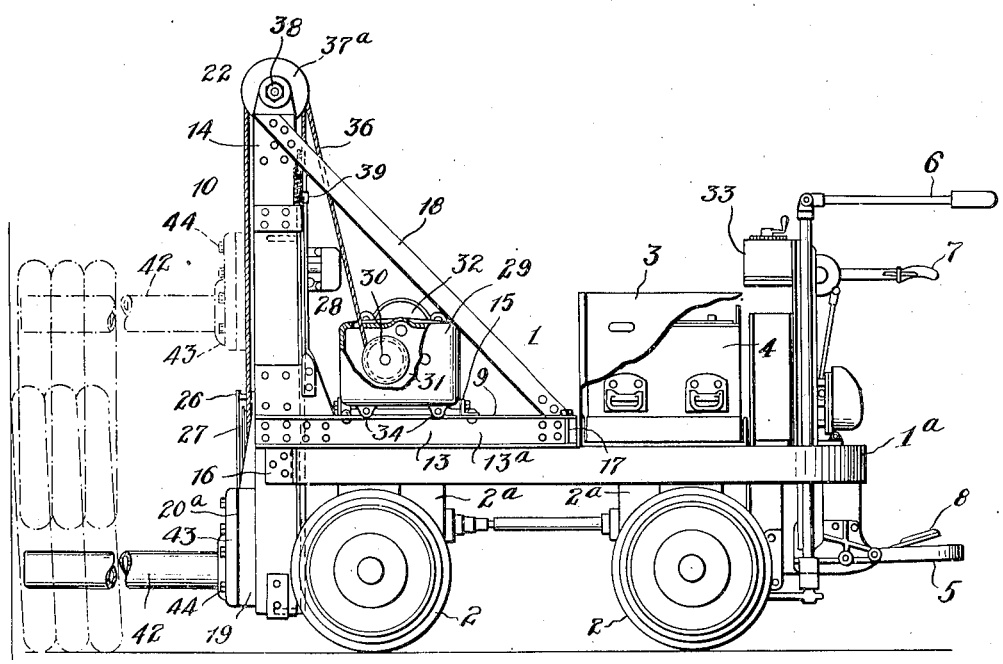
Figure 1 is a side elevation of a truck having mounted on it an elevating and carrying mechanism and automatic stopping mechanism embodying my invention.

In the drawings, 1 indicates as an entirety the truck or motor vehicle, preferably of the electric motor driven type, and having a frame 1ª and wheels 2, certain or all of which, if desired, may be driven by a driving mechanism 2ª and steered. 3 indicates a housing within which suitable storage batteries 4 may be arranged. In Figs. 1 and 2 I have shown at one end of the truck a platform 5 on which the operative may stand, and control elements 6, 7 and 8 in convenient positions for manipulation in a well-known way.

10 indicates as an entirety the lifting and carrying mechanism rigidly mounted on the frame 1ª and platform 9 of the truck 1. Of the lifting and carrying mechanism, 12 indicates a frame preferably comprising a base 13 fixed to the frame 1ª and platform 9 and a pair of spaced guide members 14 preferably extending vertically above and below the base 13. The guide members 14 preferably consist of channel bars the flanges of which may serve as front and rear guide walls for an elevating member 19 to be later referred to.

The base 13 preferably comprises a pair of channel bars 13ª, which may be connected together by cross members, one thereof being indicated at 15. The frame 12 is secured to the truck by a pair of angle plates 16, which are bolted and riveted to the truck frame 1ª and guide members 14, respectively, and by bolts 17 extending through the channel bars 13ª near their inner ends. The upper ends of the guides 14 may be braced by a pair of tie-rods 18 rigidly secured in any well-known manner to the inner ends of the bars 13ª.

The elevating member 19 comprises a casting having a body portion 19ª provided with seats 20, 20ª, and pairs of upper and lower arms 21. The body portion 19ª is adapted to have connected to it a lifting and carrying element 22 which will be later described. 23 indicates devices carried by the arms 21 and arranged to engage the flanges of the guide members 14. The devices 23 preferably comprise flanged rollers 23ª mounted on stud-shafts 23ᵇ the stems of which fit into openings formed in the arms 21. The arms 21 of each pair are preferably offset, relative to the central longitudinal plane of the guide members, whereby the upper devices 23 will engage the front flanges of the guide members 14 and the lower devices 23 will engage the rear flanges thereof. 24 indicates a pair of spaced lugs between which extends a pin or shaft 25. 26 indicates a frame swiveled on the pin or shaft 25 and supporting between its bifurcated members a pulley or sheave 27 the purpose of which will be later set forth.

28 indicates as an entirety a mechanism for raising and lowering the elevating member 19. Of this mechanism, 29 indicates a frame preferably in the form of a casing. The opposite end walls of the casing are provided with openings to receive and support the opposite ends of a shaft 30 carrying a drum 31. 32 indicates an electric motor preferably mounted on a bracket or other extension member of the frame 29. The shaft of the motor 32 is connected through suitable gearing (not shown) with the drum shaft, whereby the latter may be driven in either direction at will. 33 indicates a suitable controller, for operating the motor 32. The controller is placed within convenient reach of the operative. 34 indicates a plurality of devices serving to rigidly clamp the casing 29 to the bars 13$^a$, at all times. 36 indicates the hoisting rope or cable, which is adapted to be wound on and unwound from the drum 31. The rope is connected to the drum in any suitable manner. From it, the rope 36 extends upwardly around a sheave 37 loosely mounted on a shaft 38 supported by the upper ends of the guide members 14. The rope then extends downwardly around the pulley or sheave 27 and then upwardly and over a second sheave 37$^a$ on the shaft 38, its opposite end being anchored in any desired manner, for example by a clamp 39.

Figures 3, 7, 8:
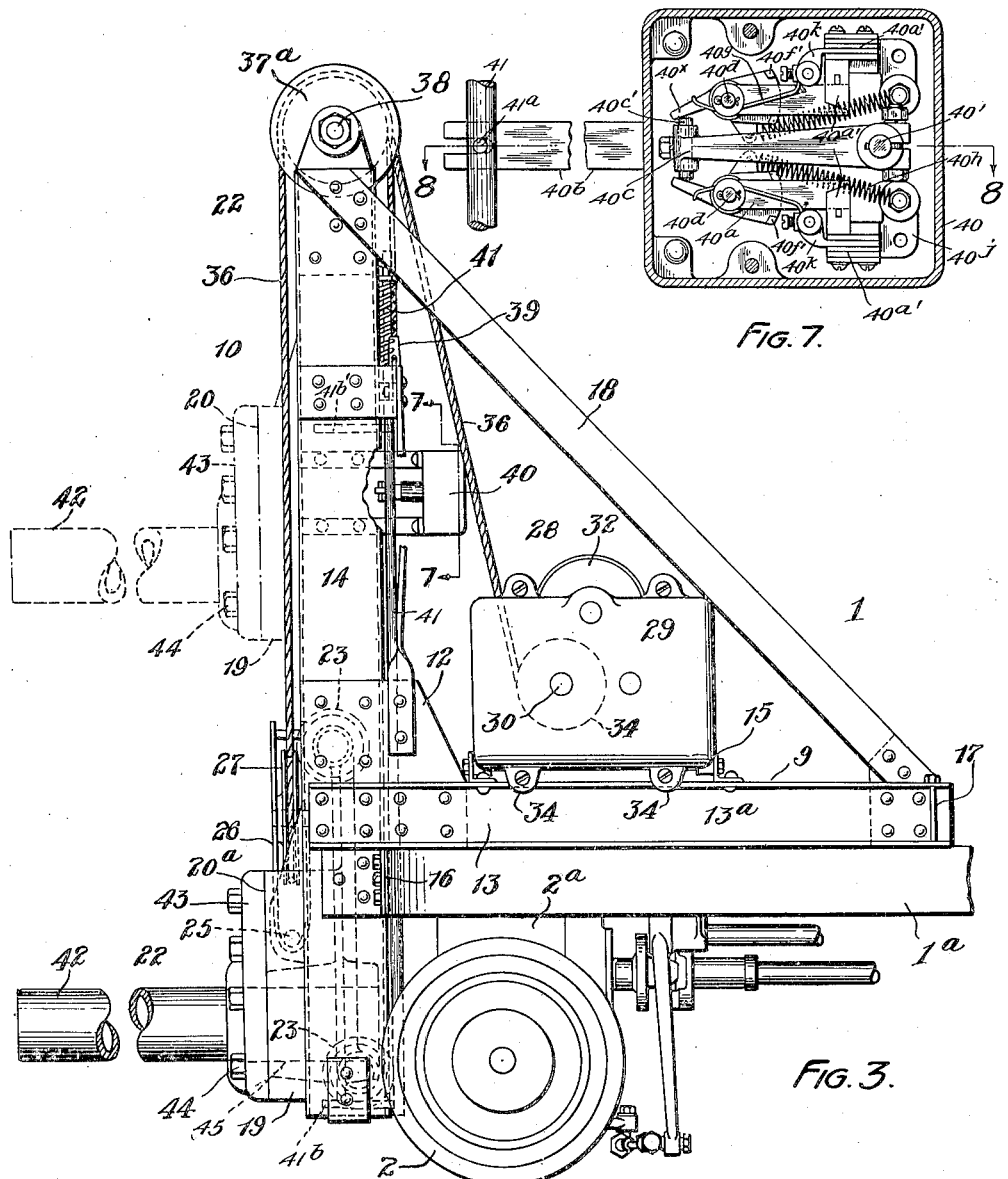
Fig. 3 is a fragmentary, side elevational view, enlarged.
Fig. 7 is a section on the line 7—7 of Fig. 3.
Fig. 8 is a section on the line 8—8 of Fig. 7.

40 indicates a casing having suitable contact devices 40$^a$, 40$^{a\prime}$, through which electric current is established to operate the motor 32 when the lifting member is raised and lowered. As shown, there are two pairs of contacts 40$^a$, 40$^{a\prime}$, one of which (40$^a$) of each pair is operated to break the circuit through it and the adjacent contact. 40$^\prime$ indicates a shaft mounted in one wall of the casing 40 and carrying on its outer end an arm 40$^b$, to which reference will later be made, and on its inner end a lever 40$^c$. 40$^d$ indicates a pair of shafts mounted in the casing at equal distance from the lever 40$^c$ when the latter is in its mid-position, and connected through a plate 40$^{d\prime}$ with a terminal 40$^e$, to which the lead is connected by one or more screws, as shown in Fig. 8. Each shaft 40$^d$ pivotally supports the adjacent contact 40$^a$ so that it may swing into and out of engagement with the other contact 40$^{a\prime}$ of the pair. 40$^f$ indicates a rocker pivotally mounted on each shaft 40$^d$. Corresponding ends 40$^x$ of the rockers 40$^f$ extend laterally to either side of the lever 40$^c$, whereby the latter may engage either rocker end and swing the rocker on its supporting shaft 40$^d$. The opposite ends of the rockers are provided with spaced lugs 40$^{t\prime}$ which engage the contacts to move them in either direction. As shown, the lugs 40$^{t\prime}$ on each rocker are spaced apart a greater distance than the width of the contact 40$^a$ so that the rocker 40$^f$ may move a predetermined distance before one of the lugs will engage the contact. This form of construction enables me to provide a spring 40$^g$ around the adjacent shaft 40$^d$, one end of the spring engaging with the rocker end 40$^x$ and its opposite end engaging with the contact 40$^a$ to swing it out of engagement with the contact 40$^{a\prime}$ upon the movement of the adjacent rocker. As a result of this arrangement, operation of the rocker 40$^f$ will first put the spring 40$^g$ under tension, then upon engagement of a lug with the contact, the rocker will move the latter relative to the contact 40$^{a\prime}$ to effect disengagement therewith, following which the tension of the spring will impart to the contact 40$^a$ a quick movement and thus prevent arcing. 40$^h$, 40$^h$, indicate springs each connected at one end in any well known manner to the casing or a bolt mounted therein and at its opposite end to a flange 40$^{h\prime}$ provided on the adjacent rocker 40$^f$. Each spring 40$^h$ tends to return the adjacent rocker and through it the contact 40$^a$ actuated thereby to normal position, which operation takes place following the return of the lever 40$^c$ to its mid-position. The outer end of the lever 40$^c$ may be provided with a rod 40$^{c\prime}$ which may be adjusted endwise in either direction so that the lever 40$^c$ may move either rocker the desired distance when it is operated. The contacts 40$^{a\prime}$ may be of any desired construction. The contacts 40$^{a\prime}$ are preferably connected to blocks 40$^j$, each having a suitable connector 40$^k$ for a lead. As shown in Fig. 8, the lever 40$^c$ is curved laterally at its free end so as to dispose the rod 40$^{c\prime}$ in line with the rocker ends 40$^x$. The arm 40$^b$ being secured to the shaft 40$^\prime$ (as already described) serves to operate either of the contacts 40$^a$, 40$^a$, as just described, to break the electric circuit when the arm is swung in one direction or the other. At its outer end the arm 40$^b$ is bifurcated and straddles a pin or projection 41$^a$ carried by a movable member 41. The member 41 preferably comprises a bar disposed between the guides 14 and extending longitudinally thereof. The bar 41 carries a pair of spaced tappets 41$^b$, 41$^{b\prime}$, which project into the path of movement of the elevating member 19 or some element carried thereby. The bar 41 is slidably mounted by suitable guide devices 41$^c$ (one being shown in Fig. 4), whereby it can move endwise in either direction. The normal position of the bar 41 is shown in Fig. 4, being held against movement downwardly by a coiled spring 41$^\prime$ interposed between the guide device 41ᶜ and a collar or washer 41ᵈ adjustably mounted on the upper end of the rod by a nut 41ᵉ. Upon engagement of the member 19 with one of the tappets 41ᵇ, or 41ᵇ', the bar 41 is moved endwise and it in turn, through the pin 41ᵃ, swings the arm 40ᵇ, causing the latter to break the circuit. This operation shuts off the motor 32 and arrests the elevating member 19 against further movement. If the bar 41 has been moved upwardly, it will move downwardly by gravity when the elevating member 19 is operated downwardly, until the spring 41' engages the guide device 41ᶜ; if the bar 41 has been moved downwardly, such movement will compress the spring 41' which will return the bar to normal position when the elevating member 19 moves upwardly.

The lifting and carrying element 22 shown for example in Figs. 1 to 6, inclusive, is so shaped that it can be first moved, extended or projected in an endwise direction into or through a plurality of stacked hollow or ring-shaped devices or objects (for example vehicle tires or rims) that are to be transported, and then lifted or elevated to free the devices or objects from their support; thus adapting itself as an automatic loader. For this application of my invention, the lifting and carrying element 22 comprises a horizontally extending arm 42 and a base member 43 adapted to be removably secured to the seats or base portions 20, 20ᵃ, of the elevating member 19 by a plurality of cap screws 44. The arm 42 preferably comprises a tubular member and its inner end may extend through and beyond the base member 43 and removably fit an opening 45 formed in the elevating member 19. As a result of this arrangement, the screws 44 are relieved of undue strains, when the lifting and carrying element is supporting or transporting objects.

From the foregoing description it will be seen that I have provided a relatively simple form of limiting means in which the operated element is supported to move in a direction parallel to the movement of the elevating member and carries devices that are disposed in the path of movement of the latter. By such arrangement and construction, positive operation of the operated element is insured and its movement back to normal position is readily effected.

This application is a division of my application filed March 11, 1921, Serial No. 451,622.

To those skilled in the art of making mechanism of the class described, many alterations in construction and widely differing embodiments and applications of my invention will suggest themselves, without departing from the spirit and scope thereof. In fact, it will be noted that my invention may be applied to and associated with various forms of elevating mechanisms, examples of which are shown in my aforesaid application, Serial No. 451,622. My disclosures and the description herein are purely illustrative and are not intended to be in any sense limiting.

What I claim is:—

1. In a truck, the combination with a frame mounted on wheels, of a pair of vertical guides on said frame, an elevating mechanism having an element movably supported by said guides and means for raising and lowering said element, an electric motor for driving said means, a controller for controlling the operation of said motor, a switch having contacts through which the circuit to said motor is completed when operated, and a bar arranged adjacent said guides, operatively connected with said switch and provided with devices arranged in the path of movement of said element, whereby the latter engages one of said devices when moved in either direction and operates said switch.

2. In a truck, the combination with a frame mounted on wheels, of a vertical guide on said frame, an elevating mechanism including an electric motor, a source of current supply therefor, an element movably supported in said guide, a controller controlling the operation of said motor, a switch having pairs of contacts through one pair of which the circuit for said motor is completed when operating in either direction, a movably supported bar, devices carried by the bar and arranged in the path of movement of said elevating element, whereby the latter operates the bar when moving in either direction, a spring disposed between said bar and its support serving to yieldingly support said bar in normal position and operating to return the bar to such position after it has been moved in one direction, and connections between the bar and said switch, whereby the bar will break the circuit through one pair of said contacts when it is moved in either direction.

3. In apparatus of the class described, the combination of a main frame mounted on wheels, a guide frame, an elevating member movably supported on said guide frame, means for raising and lowering said member, said means including an electric motor, guide devices supported in operative relationship to said guide frame, a bar mounted to slide endwise in said guide devices, a collar on said bar, a spring interposed between said collar and a guide device serving to support the bar in a mid-position and to stop downward movement thereof at such position under the influence of gravity after the bar has been moved upwardly and to return the bar to such position after it has been moved downwardly, spaced devices carried by said bar and disposed in the path of movement of said elevating member, whereby the latter will engage one of them and move said bar when operated in either direction, and a switch arranged to be actuated by said bar when moved in either direction to stop said motor.

4. In a truck, the combination of a frame, wheels for supporting said frame, vertical guides supported by said frame, an elevating member slidably engaging said guides, means carried by said frame and engaging said elevating member to move it along said guides, a guide device, a bar mounted to move endwise in said guide device, a spring between said bar and said device and serving to return the bar to normal position after it has been moved in one direction, devices carried by said bar and arranged to be engaged by said elevating member when moved in either direction to operate said bar, and switch means arranged to be actuated by the movement of said bar to stop said moving means.

5. In a truck, the combination of a frame, wheels for supporting said frame, vertical guides supported by said frame, an elevating member slidably engaging said guides, means carried by said frame and engaging said elevating member to move it along said guides, a guide device, a bar mounted to move endwise in said guide device, a spring between said bar and said device and serving to return the bar to normal position after it has been moved in one direction, devices carried by said bar and engaged by said elevating member when moved in either direction to operate said bar, and switch means comprising pairs of contacts one pair of which is opened upon the movement of said bar in either direction, whereby said moving means are stopped.

6. In a truck, the combination of a frame, wheels for supporting said frame, vertical guides supported by said frame, an elevating member slidably engaging said guides, means carried by said frame and engaging said elevating member to move it along said guides, a guide device, a bar mounted to move endwise in said guide device, a spring between said bar and said device and serving to return the bar to normal position after it has been moved in one direction, devices carried by said bar and engaged by said elevating member when moved in either direction to operate said bar, switch means comprising pairs of contacts one pair of which is opened upon the movement of said bar in either direction, whereby said moving means are stopped, and means acting on the movable contact of each pair to move it into engagement with the other contact upon the return of said bar to normal position.

In witness whereof I have hereunto subscribed my name.

EDWARD H. REMDE.